E. R. DURGIN.
COMBINATION METAL AND NON-METAL RIM FOR EYEGLASS LENSES.
APPLICATION FILED JAN. 17, 1919.
1,325,511. Patented Dec. 23, 1919.
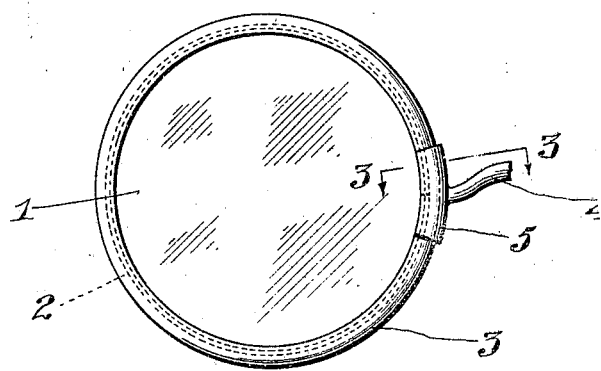
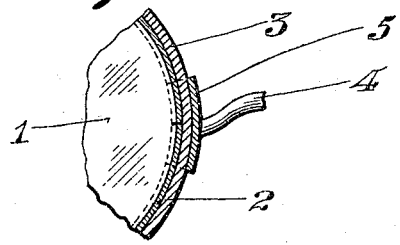
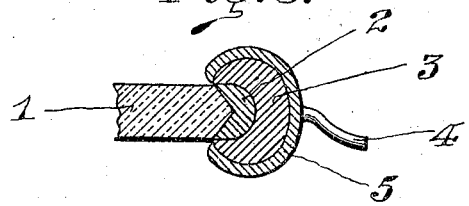
INVENTOR
Edgar R. Durgin
BY
Cyrus N. Anderson
ATTORNEY.

UNITED STATES PATENT OFFICE.

EDGAR R. DURGIN, OF NEWARK, NEW JERSEY, ASSIGNOR TO NEW JERSEY OPTICAL CO., OF NEWARK, NEW JERSEY, A CORPORATION OF NEW JERSEY.

COMBINATION METAL AND NON-METAL RIM FOR EYEGLASS-LENSES.

1,325,511.  Specification of Letters Patent.  Patented Dec. 23, 1919.

Application filed January 17, 1919. Serial No. 271,563.

*To all whom it may concern:*

Be it known that I, EDGAR R. DURGIN, a citizen of the United States, and a resident of Newark, in the county of Essex and State of New Jersey, have invented an Improvement in Combination Metal and Non-Metal Rims for Eyeglass-Lenses, of which the following is a specification.

It has been practicable heretofore to use continuous or endless rims or eye pieces of xylonite or equivalent material for the lenses of eyeglasses and spectacles because upon being warmed or otherwise made pliable they could be expanded or would yield sufficiently to permit the insertion therein of the said lenses. It is desirable that such rims shall shall have an inner rim or lining of metal, but heretofore, as far as I am aware, no one has produced a combination comprising an outer continuous or endless non-metallic member and a lining or inner rim member into which a lens could be inserted.

It is one of the objects of my invention to provide a rim for ophthalmic lenses consisting of an outside or encircling rim of xylonite or equivalent material and an inside rim of metal into which a lens may be inserted upon the softening of the encircling xylonite just as though the metal rim or lining were not present.

Other objects and advantages of my invention will be pointed out in the description thereof which follows or will be apparent therefrom.

In order that my invention may be readily understood and its practical commercial advantages more fully appreciated, reference may be had to the accompanying drawing in which I have illustrated one convenient form of embodiment of the same.

In the drawing:

Figure 1 is a view in front elevation of a rim constructed in accordance with my invention with the lens in place therein;

Fig. 2 is a view showing a portion of the lens frame in longitudinal section and also showing in section the clamp for connecting an end of the nose bridge thereto; and Fig. 3 is a transverse section taken on the line 3—3 of Fig. 1.

In view of the fact that the invention relates to the construction of the respective rims for the lenses of eyeglasses or spectacles, I have shown but a single rim and the lens therein, deeming it unnecessary to show a complete pair of eyeglasses.

Referring to the drawing: 1 designates a lens, the outer edge of which is seated in the groove upon the inner side of the metallic eye wire 2. This wire is situated within and is encircled by a continuous non-jointed endless rim of xylonite or equivalent material 3. This material is of such nature that upon being heated it becomes pliable and in such condition will permit the insertion of a lens in the rim. The metallic eye wire 2 is held within the outer non-metallic rim 3 by being seated in an inner groove in the latter, but is not otherwise attached thereto, nor are its ends secured together; consequently upon the stretching and expanding of the outer non-metallic rim portion the inner metallic portion 2 may likewise be enlarged or expanded by the separation of its ends so as to permit the insertion of a lens therein.

4 designates a bridge which is employed for connecting the rims of a pair of eyeglasses together, such bridge being connected to the rims by means of clamping portions 5. These clamps are in engagement with the non-metallic rim portion 3 but do not engage with or clamp against the inner metallic eye wire or rim portion 2. In Figs. 1 and 2 the adjacent opposing ends of the inner eye wire 2 are situated opposite the end of the bridge 4 and intermediate the opposite sides of the clamp 5. It will be understood, however, that the said ends may be situated at any other point within the outer non-metallic rim portion 3. For instance, the inner metallic eye wire or rim portion 2 may be turned within the outer non-metallic rim portion 3 so that the said adjacent opposing ends thereof occupy a position directly across the lens at the opposite side of the rim from that in which they are shown in Fig. 1.

By the provision of an inner eye wire, non-continuous, with its ends disconnected, and said wire not being connected with the outer inclosing rim portion of xylonite or other equivalent material, I am enabled to construct the latter as a continuous, unbroken member. This is due to the fact that when the said inclosing rim portion is heated or otherwise rendered pliable and is stretched and expanded, the inclosed metallic eye wire may also be enlarged by separating its ends and expanding it to coincide with the expansion and stretching of the inclosing xylonite rim portion or rim portion of other equivalent material.

I have not shown nose gripping members or temple wires in the drawing illustrating my invention because these members constitute no part of my invention and their use and the manner of attaching them to eyeglasses and eyeglass frames are well known.

I claim:

1. A combination rim for eyeglasses and spectacles, comprising a continuous and endless non-metallic rim portion and having a groove upon the inner side thereof, and a metallic lining situated in said groove, said lining being likewise provided with an inner groove, said metallic lining having its ends in adjacent opposing relation but disconnected from each other.

2. A combination rim for eyeglasses and spectacles, comprising an outer non-metal rim having a groove upon the inner side thereof, an inner metallic rim seated in said groove and being provided with an inner groove to receive the edge of a lens, the said inner metallic rim being disconnected from said outer rim and having its ends in adjacent opposing relation to but disconnected from each other.

In testimony that I claim the foregoing as my invention I have hereunto set my hand this 15th day of January, A. D., 1919.

EDGAR R. DURGIN.